(12) United States Patent
Pinarbasi

(10) Patent No.: US 7,350,284 B2
(45) Date of Patent: Apr. 1, 2008

(54) METHODS OF MAKING A CURRENT-PERPENDICULAR-TO-THE-PLANES (CPP) TYPE SENSOR BY ION MILLING TO THE SPACER LAYER USING A MASK WITHOUT UNDERCUTS

(75) Inventor: Mustafa M. Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 449 days.

(21) Appl. No.: 10/976,511

(22) Filed: Oct. 29, 2004

(65) Prior Publication Data

US 2006/0094129 A1    May 4, 2006

(51) Int. Cl.
G11B 5/127 (2006.01)
H04R 31/00 (2006.01)

(52) U.S. Cl. .............. 29/603.16; 29/603.13; 29/603.15; 29/603.18; 216/65; 360/122; 360/126; 360/317; 427/127; 427/128; 451/5; 451/41

(58) Field of Classification Search .............. 29/603.13–603.16, 603.18; 216/65; 360/122, 360/126, 317, 324–327; 427/127, 128; 451/5, 451/41
See application file for complete search history.

(56) References Cited

U.S. PATENT DOCUMENTS

| | | |
|---|---|---|
| 5,650,958 A | 7/1997 | Gallagher et al. |
| 5,841,692 A | 11/1998 | Gallagher et al. |
| 6,271,998 B1 | 8/2001 | Coehoorn et al. |
| 6,353,318 B1 * | 3/2002 | Sin et al. ............ 324/252 |
| 6,538,861 B1 | 3/2003 | Hayashi et al. |
| 6,674,664 B2 | 1/2004 | Pohm |
| 6,718,621 B1 | 4/2004 | Hayashi et al. |
| 7,118,680 B2 * | 10/2006 | Chang et al. ............ 216/22 |
| 2002/0036919 A1 | 3/2002 | Daughton et al. |
| 2003/0030093 A1 | 2/2003 | Agarwal et al. |
| 2003/0035256 A1 | 2/2003 | Hayashi et al. |
| 2003/0137780 A1 | 7/2003 | Fontana et al. |
| 2003/0197988 A1 | 10/2003 | Hasegawa et al. |
| 2003/0231437 A1 | 12/2003 | Childress et al. |
| 2004/0063223 A1 | 4/2004 | Costrini et al. |

* cited by examiner

Primary Examiner—Paul D. Kim
(74) Attorney, Agent, or Firm—John J. Oskorep, Esq.; Matthew Zises

(57) ABSTRACT

In one particular example, a plurality of CPP type sensor layers are formed over a wafer and a mask without undercuts is formed over the plurality of CPP type sensor layers in a central region. With the mask without undercuts in place, an ion milling process is started to remove CPP type sensor layer materials left exposed by the mask without undercuts in end regions which surround the central region. The ion milling process is stopped at or near a spacer layer of the CPP type sensor layers. Insulator materials are then deposited in the end regions where the CPP type sensor layer materials were removed, followed by hard bias materials over the insulator materials. The mask without undercuts is then removed through use of a chemical-mechanical polishing (CMP) assisted lift-off process, which also planarizes the top surface.

29 Claims, 9 Drawing Sheets

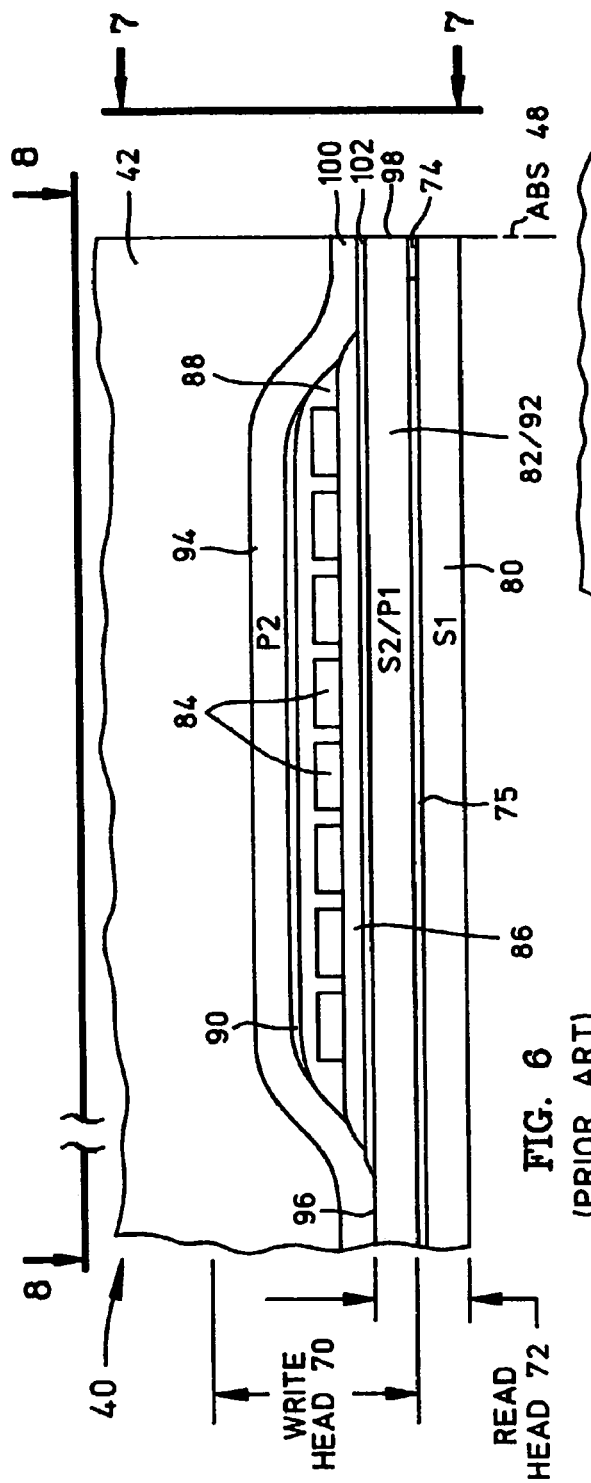
FIG. 6 (PRIOR ART)
FIG. 7 (PRIOR ART)
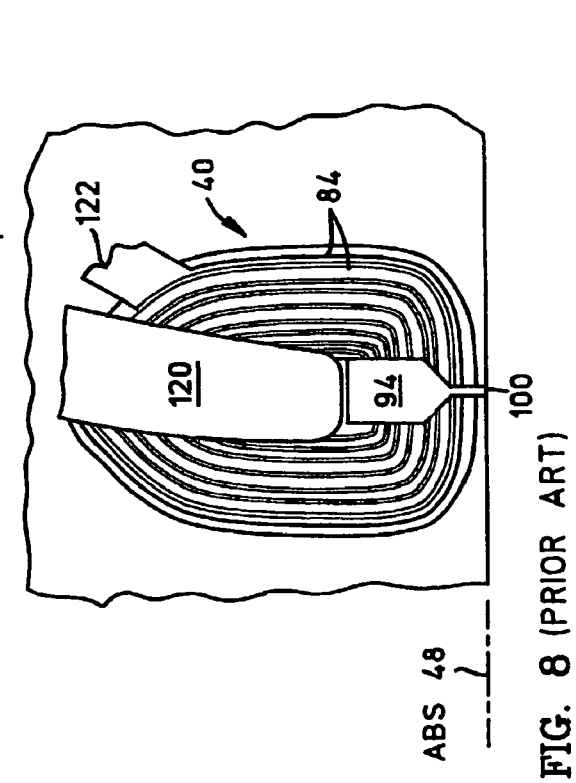
FIG. 8 (PRIOR ART)

METHODS OF MAKING A CURRENT-PERPENDICULAR-TO-THE-PLANES (CPP) TYPE SENSOR BY ION MILLING TO THE SPACER LAYER USING A MASK WITHOUT UNDERCUTS

BACKGROUND

1. Field of the Technology

The present invention relates generally to methods of making read sensors of the current-perpendicular-to-the-planes (CPP) giant magnetoresistive (GMR) type and the CPP magnetic tunnel junction (MTJ) type.

2. Description of the Related Art

Computers often include auxiliary memory storage devices having media on which data can be written and from which data can be read for later use. A direct access storage device (disk drive) incorporating rotating magnetic disks are commonly used for storing data in magnetic form on the disk surfaces. Data is recorded on concentric, radially spaced tracks on the disk surfaces. Magnetic heads which include read sensors are then used to read data from the tracks on the disk surfaces.

In high capacity disk drives, magnetoresistive (MR) read sensors, commonly referred to as MR heads, may be used to read data from a surface of a disk at greater linear densities than thin film inductive heads. An MR sensor detects a magnetic field through the change in the resistance of its MR sensing layer (also referred to as an "MR element") as a function of the strength and direction of the magnetic flux being sensed by the MR layer. The conventional MR sensor operates on the basis of the anisotropic magnetoresistive (AMR) effect in which the MR element resistance varies as the square of the cosine of the angle between the magnetization of the MR element and the direction of sense current flow through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage. Within the general category of MR sensors is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and non-magnetic layers and within the magnetic layers. GMR sensors using only two layers of ferromagnetic material (e.g. nickel-iron, cobalt-iron, or nickel-iron-cobalt) separated by a layer of nonmagnetic material (e.g. copper) are generally referred to as spin valve (SV) sensors manifesting the SV effect.

One of the ferromagnetic (FM) layers referred to as the pinned layer has its magnetization typically pinned by exchange coupling with an antiferromagnetic (AFM) layer (e.g., nickel-oxide, iron-manganese, or platinum-manganese). The pinning field generated by the AFM pinning layer should be greater than demagnetizing fields to ensure that the magnetization direction of the pinned layer remains fixed during application of external fields (e.g. fields from bits recorded on the disk). The magnetization of the other FM layer referred to as the free layer, however, is not fixed and is free to rotate in response to the field from the information recorded on the magnetic medium (the signal field). The pinned layer may be part of an antiparallel (AP) pinned structure which includes an antiparallel coupling (APC) layer formed between first and second AP pinned layers. The first AP pinned layer, for example, may be the layer that is exchange coupled to and pinned by the AFM pinning layer. By strong antiparallel coupling between the first and second AP pinned layers, the magnetic moment of the second AP pinned layer is made antiparallel to the magnetic moment of the first AP pinned layer.

Sensors are classified as a bottom sensor or a top sensor depending upon whether the pinned layer is located near the bottom of the sensor close to the first read gap layer or near the top of the sensor close to the second read gap layer. Sensors are further classified as simple pinned or AP pinned depending upon whether the pinned structure is one or more FM layers with a unidirectional magnetic moment or a pair of AP pinned layers separated by the APC layer with magnetic moments of the AP pinned layers being antiparallel. Sensors are still further classified as single or dual wherein a single sensor employs only one pinned layer and a dual sensor employs two pinned layers with the free layer structure located there between.

A read sensor may also be of a current-perpendicular-to-the-planes (CPP) type in which current flows perpendicular to the major planes of the sensor layers. First and second shield layers engage the bottom and the top, respectively, of the sensor so as to simultaneously serve as electrically conductive leads for the sensor. The CPP type sensor may be contrasted with a current in parallel to the-planes (CIP) type sensor in which the current is conducted in planes parallel to the major thin film planes of the sensor. In a CPP type sensor, when the nonmagnetic spacer layer between the free layer and the AP pinned structure is electrically conductive (such as Cu), the current is referred to as a "sense current" and the sensor is referred to as a CPP GMR type sensor. However when the nonmagnetic spacer layer, or "tunnel barrier" layer is electrically nonconductive (such as $Al_2O_3$), the current is referred to as a "tunneling current" and the sensor is referred to as a CPP Magnetic Tunnel Junction (MTJ) type sensor. Hereinafter, the current is referred to as a perpendicular current $I_p$ which can be either a sense current or a tunneling current.

It is important to manufacture these sensors in an appropriate fashion to obtain suitable manufacturing yields and adequate performance. Typically, after the deposition of a plurality of sensor layers over a substrate and the formation of a mask in a central region, an ion milling process is performed to remove sensor layers left exposed by the mask in end regions to thereby define an adequate trackwidth (TW). This ion milling process, while necessary to form the sensor, may result in the re-deposition of electrically conducting material (such as metal particles or contamination) along the sides of the spacer layer such that the pinned ferromagnetic layer and the free ferromagnetic layer become short-circuited. Also, conventional masks used during the ion milling do not provide for a well-defined trackwidth (TW).

Accordingly, there is an existing need to overcome these and other deficiencies of the prior art.

SUMMARY

Methods for use in forming current-perpendicular-to-the-planes (CPP) type sensors, including CPP giant magnetoresistance (GMR) type and CPP magnetic tunnel junction (MTJ) type sensors are disclosed. In one particular example, a plurality of CPP type sensor layers are formed over a wafer and a mask without undercuts is formed over the plurality of CPP type sensor layers in a central region. With the mask without undercuts in place, an ion milling process is started to remove CPP type sensor layer materials left exposed by the mask without undercuts in end regions which surround the central region. The ion milling process is stopped at or near a spacer layer of the CPP type sensor layers. Insulator materials are then deposited in the end regions where the CPP type sensor layer materials were removed, followed by hard bias materials over the insulator materials. The mask without undercuts is then removed through use of a chemical-mechanical polishing (CMP) assisted lift-off process, which also planarizes the top surface. Typical sensor techniques of the art are then performed to complete manufacture of the CPP type sensor. Using the mask without undercuts enables the removal of a freelayer of the plurality of CPP type sensor layers down to the spacer layer or beyond to form the CPP type sensor with sharp and steep sidewalls which is not possible with conventional mask structures. The act of stopping the ion milling process at or near the spacer layer reduces a likelihood of electrical shorting around side edges of the spacer layer. This unique combination thereby results in improved CPP type sensor performance through improved amplitude and stability.

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 6 is a partial view of the slider and a merged magnetic head as seen in plane 6-6 of FIG. 2;

FIG. 7 is a partial ABS view of the slider taken along plane 7-7 of FIG. 6 to show the read and write elements of the magnetic head;

FIG. 8 is a view taken along plane 8-8 of FIG. 6 with all material above the coil layer and leads removed;

DETAILED DESCRIPTION OF THE PREFERRED EMBODIMENTS

Methods for use in forming current-perpendicular-to-the-planes (CPP) type sensors, including CPP giant magnetoresistance (GMR) type and CPP magnetic tunnel junction (MTJ) type sensors are disclosed. In one particular example, a plurality of CPP type sensor layers are formed over a wafer and a mask without undercuts is formed over the plurality of CPP type sensor layers in a central region. With the mask without undercuts in place, an ion milling process is started to remove CPP type sensor layer materials left exposed by the mask without undercuts in end regions which surround the central region. The ion milling process is stopped at or near a spacer layer of the CPP type sensor layers. Insulator materials are then deposited in the end regions where the CPP type sensor layer materials were removed, followed by hard bias materials over the insulator materials. The mask without undercuts is then removed through use of a chemical-mechanical polishing (CMP) assisted lift-off process, which also planarizes the top surface. Typical sensor techniques of the art are then performed to complete manufacture of the CPP type sensor. Using the mask without undercuts enables the removal of a freelayer of the plurality of CPP type sensor layers down to the spacer layer or beyond to form the CPP type sensor with sharp and steep sidewalls which is not possible with conventional mask structures. The act of stopping the ion milling process at or near the spacer layer reduces a likelihood of electrical shorting around side edges of the spacer layer. This unique combination thereby results in improved CPP type sensor performance through improved amplitude and stability.

The following description is the best embodiment presently contemplated for carrying out the present invention.

This description is made for the purpose of illustrating the general principles of the present invention and is not meant to limit the inventive concepts claimed herein.

Figure 1:
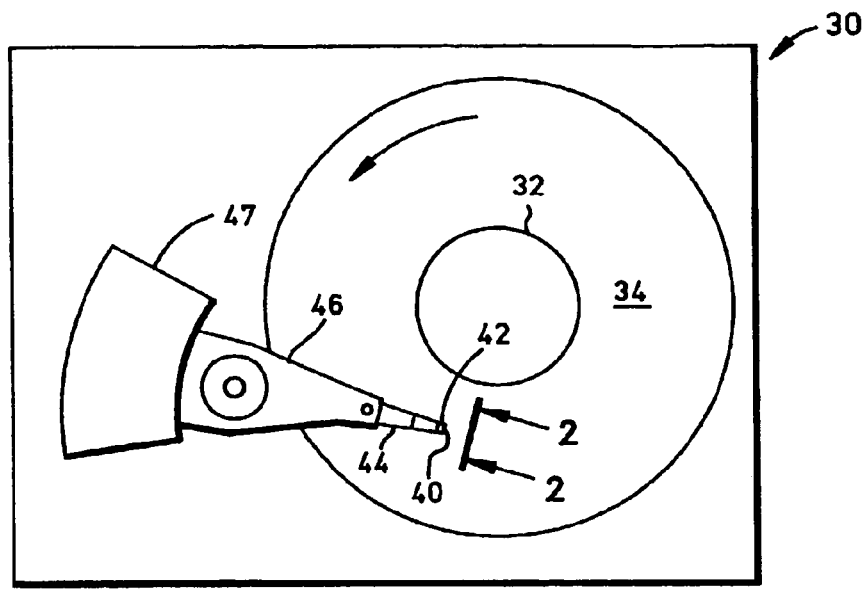
FIG. 1 is a plan view of an exemplary prior art magnetic disk drive.
Figure 2:
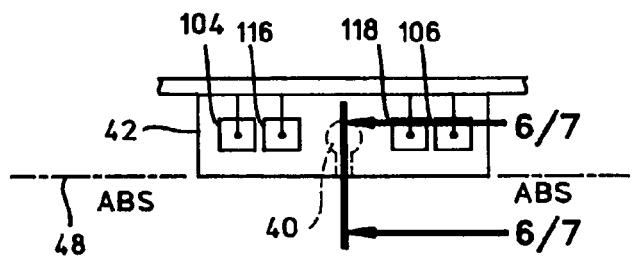
FIG. 2 is an end view of a slider with a magnetic head of the disk drive as seen in plane 2-2 of FIG. 1.
Figure 3:
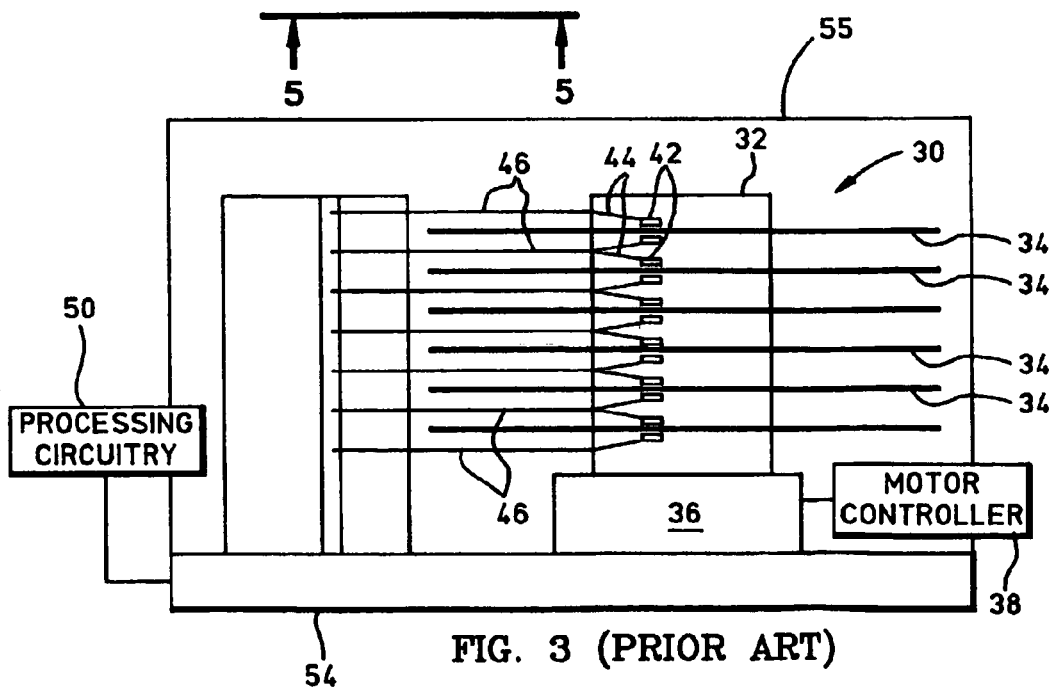
FIG. 3 is an elevation view of the magnetic disk drive wherein multiple disks and magnetic heads are employed.
Figure 4:
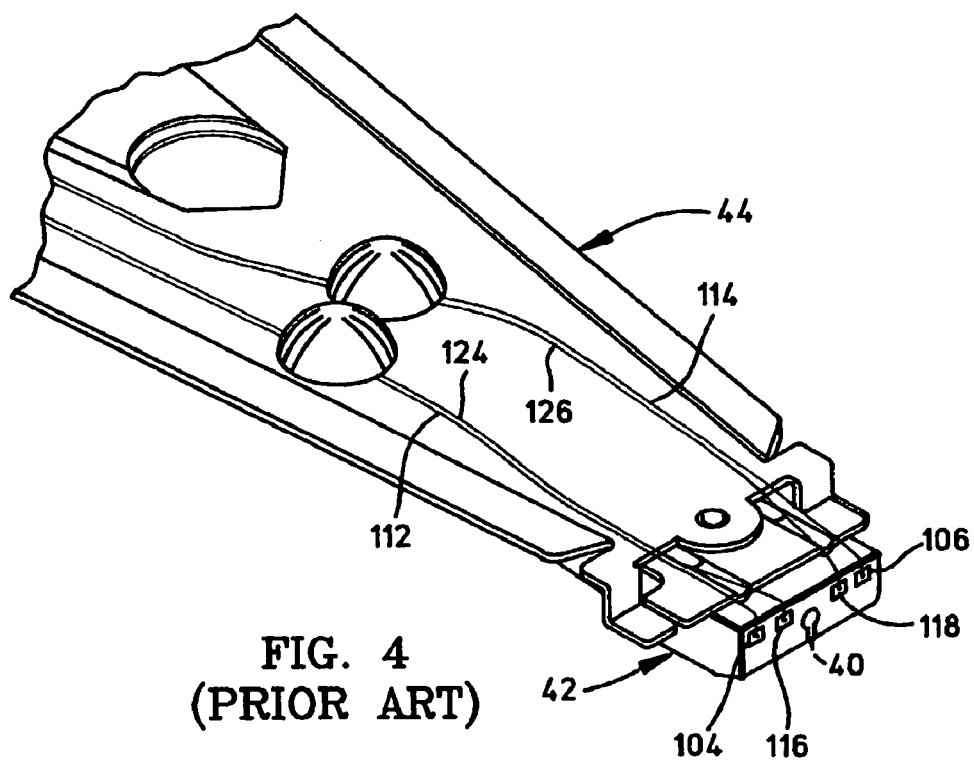
FIG. 4 is an isometric illustration of an exemplary prior art suspension system for supporting the slider and magnetic head.
Figure 5:
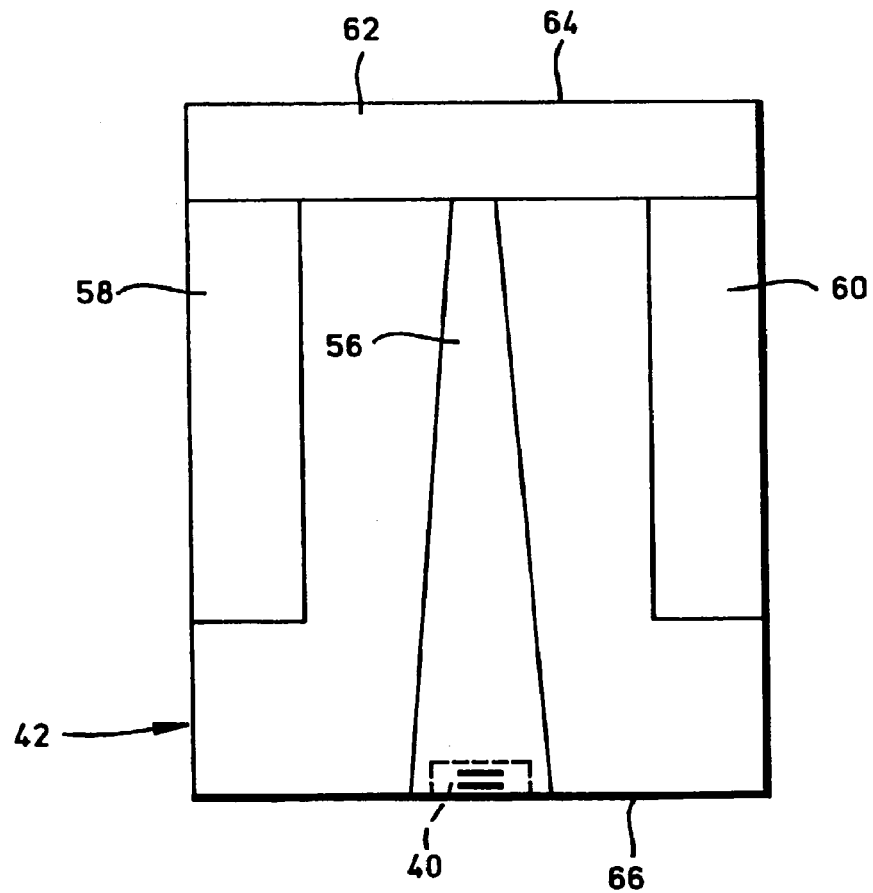
FIG. 5 is an ABS view of the magnetic head taken along plane 5-5 of FIG. 2.

Referring now to the drawings wherein like reference numerals designate like or similar parts throughout the several views, FIGS. 1-3 illustrate a magnetic disk drive 30. Disk drive 30 includes a spindle 32 that supports and rotates a magnetic disk 34. Spindle 32 is rotated by a spindle motor 36 that is controlled by a motor controller 38. A slider 42 includes a combined read and write magnetic head 40 and is supported by a suspension 44 and actuator arm 46 that is rotatably positioned by an actuator 47. Magnetic head 40 may utilize the sensor which is made in accordance with the present invention. A plurality of disks, sliders, and suspensions may be employed in a large capacity direct access storage device (DASD) as shown in FIG. 3. Suspension 44 and actuator arm 46 are moved by actuator 47 to position slider 42 so that magnetic head 40 is in a transducing relationship with a surface of magnetic disk 34. When disk 34 is rotated by spindle motor 36, slider 42 is supported on a thin (typically, 0.05 μm) cushion of air (air bearing) between the surface of disk 34 and an air bearing surface (ABS) 48. Magnetic head 40 may then be employed for writing information to multiple circular tracks on the surface of disk 34, as well as for reading information therefrom. Processing circuitry 50 exchanges signals, representing such information, with head 40, provides spindle motor drive signals for rotating magnetic disk 34, and provides control signals to actuator 47 for moving slider 42 to various tracks. In FIG. 4, slider 42 is shown mounted to a suspension 44. The components described hereinabove may be mounted on a frame 54 of a housing 55, as shown in FIG. 3. FIG. 5 is an ABS view of slider 42 and magnetic head 40. Slider 42 has a center rail 56 that supports magnetic head 40, and side rails 58 and 60. Rails 56, 58 and 60 extend from a cross rail 62. With respect to rotation of magnetic disk 34, cross rail 62 is at a leading edge 64 of slider 42 and magnetic head 40 is at a trailing edge 66 of slider 42.

FIG. 6 is a side cross-sectional elevation view of a merged magnetic head 40, which includes a write head portion 70 and a read head portion 72. Read head portion 72 includes a giant magnetoresistive (GMR) read head which utilizes a GMR sensor 74. FIG. 7 is an ABS view of FIG. 6. GMR sensor 74 is sandwiched between nonmagnetic electrically insulative first and second read gap layers 76 and 78, and read gap layers 76 and 78 are sandwiched between ferromagnetic first and second shield layers 80 and 82. In response to external magnetic fields, the resistance of GMR sensor 74 changes. A sense current $I_s$ conducted through the sensor causes these resistance changes to be manifested as potential changes. These potential changes are then processed as readback signals by processing circuitry 50 shown in FIG. 3.

Write head portion 70 of magnetic head 40 includes a coil layer 84 sandwiched between first and second insulation layers 86 and 88. A third insulation layer 90 may be employed for planarizing the head to eliminate ripples in the second insulation layer caused by coil layer 84. The first, second and third insulation layers are referred to in the art as an "insulation stack". Coil layer 84 and first, second and third insulation layers 86, 88 and 90 are sandwiched between first and second pole piece layers 92 and 94. First and second pole piece layers 92 and 94 are magnetically coupled at a back gap 96 and have first and second pole tips 98 and 100 which are separated by a write gap layer 102 at the ABS. Since second shield layer 82 and first pole piece layer 92 are a common layer, this head is known as a merged head. In a piggyback head an insulation layer is located between a second shield layer and a first pole piece layer. As shown in FIGS. 2 and 4, first and second solder connections 104 and 106 connect leads from spin valve sensor 74 to leads 112 and 114 on suspension 44, and third and fourth solder connections 116 and 118 connect leads 120 and 122 from the coil 84 (see FIG. 8) to leads 124 and 126 on suspension 44.

Figure 9:
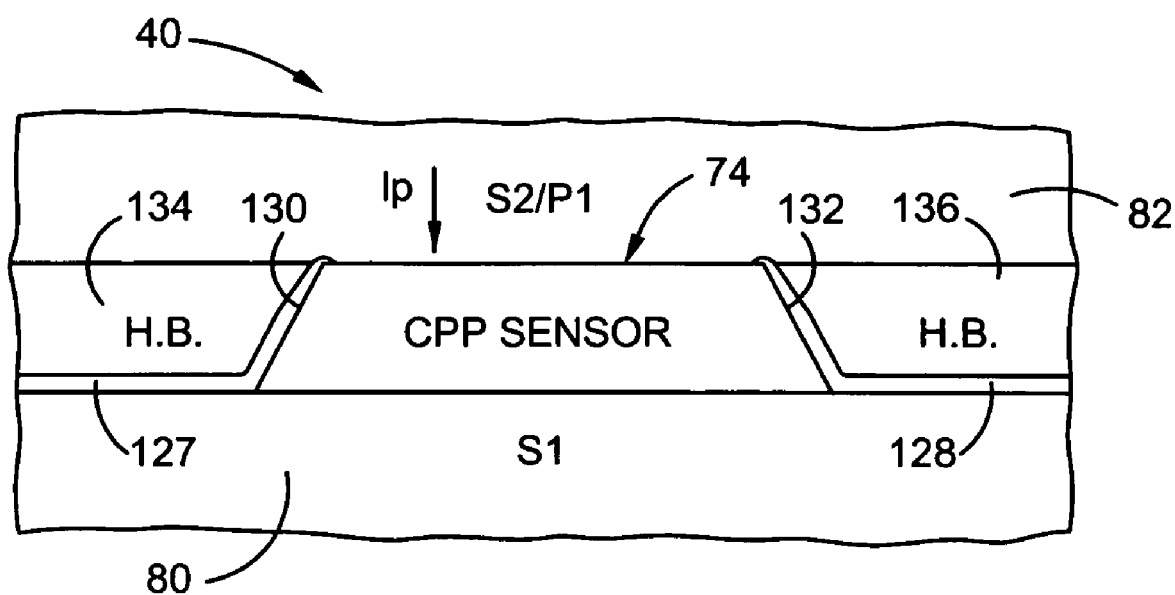
FIG. 9 is an enlarged isometric ABS illustration of a magnetic head having a current-perpendicular-to-the-planes (CPP) type sensor.

FIG. 9 is an enlarged ABS illustration of the prior art read head portion shown in FIG. 7. The read head includes the CPP type sensor 74. First and second insulation layers 127 and 128, such as alumina, cover the first shield layer 80 on each side of the sensor 74 as well as slightly covering first and second side walls 130 and 132 of the sensor. Unfortunately, portions of insulation layers 127 and 128 may cover top side edges of the sensor as shown if a conventional mask having undercuts is utilized in the sensor's fabrication. First and second hard bias layers (HB) 134 and 136 are on the insulation layers 127 and 128 and are adjacent the side walls 130 and 132. Metallic seed layers (not shown in FIG. 9) are formed between insulator layers 127 and 128 and hard bias layers 134 and 136. The hard bias layers 134 and 136 cause magnetic fields to extend longitudinally through the sensor 74 for stabilizing the free layer. The sensor 74 and the first and second hard bias layers 134 and 136 are located between ferromagnetic (FM) first and second shield layers 80 and 82 which may serve as leads for conducting the perpendicular current $I_p$ through the sensor 74.

Figure 10:
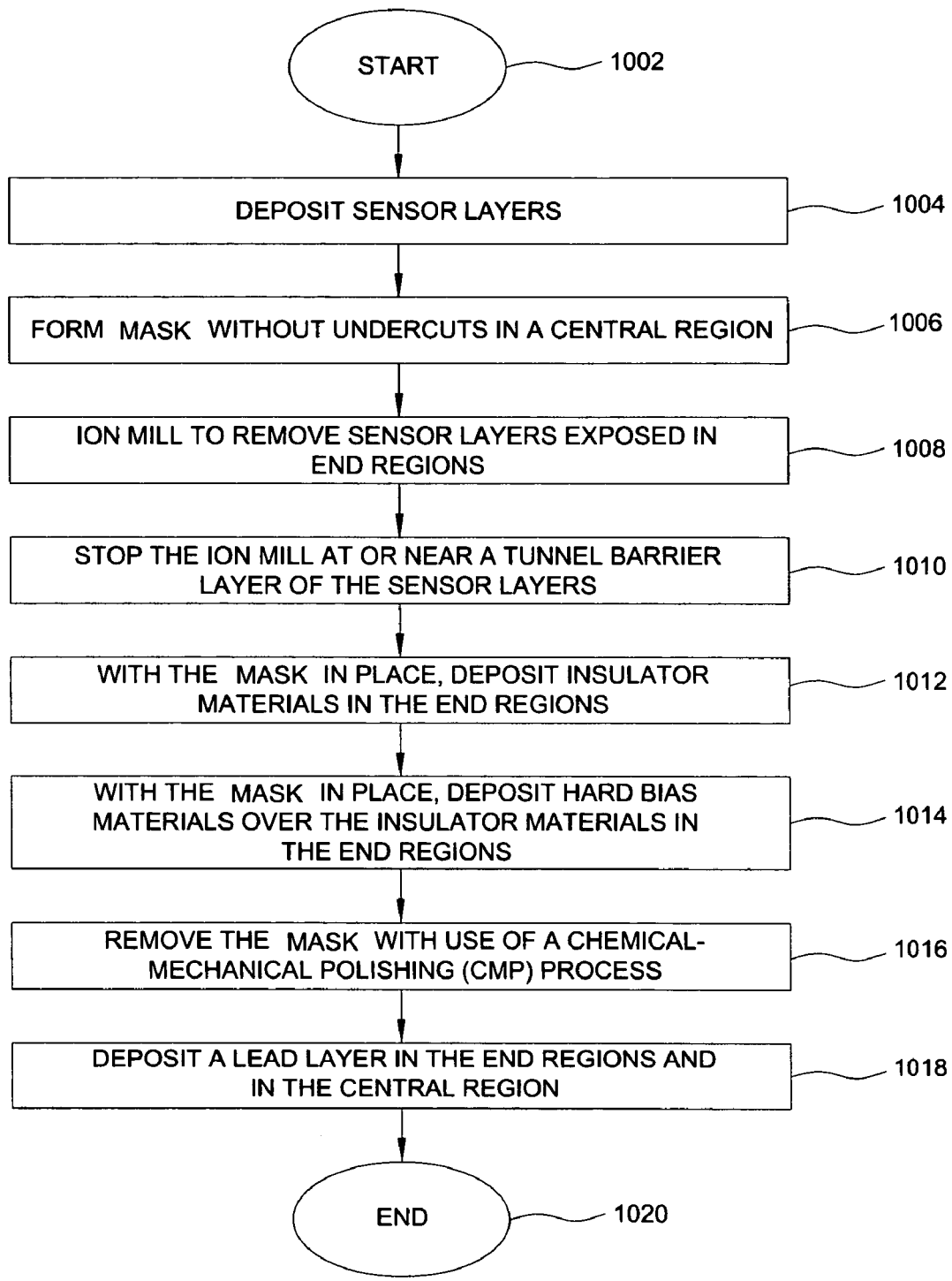
FIG. 10 is a flowchart which describes a fabrication process for a CPP type sensor which utilizes a combination of an act of stopping an ion milling process at or near a spacer layer and a mask without undercuts.

FIG. 10 is a flowchart which describes a fabrication process for a CPP type sensor. FIGS. 11-17, which are a series of ABS illustrations showing partially fabricated CPP type sensor structures corresponding to the steps described in the flowchart of FIG. 10, will be referred to in combination with the flowchart steps of FIG. 10. The method of fabrication may be used to create generally a CPP type sensor, including CPP giant magnetoresistance (GMR) type and CPP magnetic tunnel junction (MTJ) type sensors for use in the disk drive shown and described earlier above.

Figure 11:
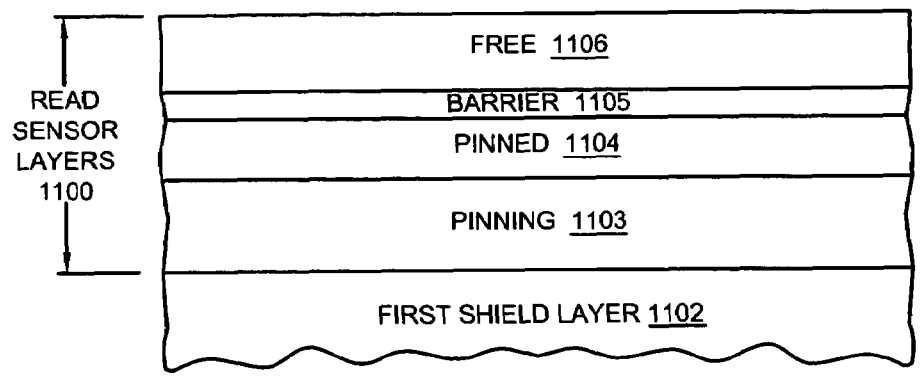
FIG. 11 is the first in a series of ABS illustrations of FIGS. 11-17 of partially fabricated CPP type sensor structures corresponding to the steps described in the flowchart of FIG. 10, showing that a plurality of CPP type sensor layers are formed over a first shield layer.

Beginning with FIG. 11, it is shown that a plurality of CPP MTJ type sensor layers 1100 are deposited in full film over a first shield layer 1102 (step 1004 of FIG. 10). CPP MTJ type sensor layers 1100 includes a pinning structure 1103, a pinned layer structure 1104 (second magnetic and electrically conductive layers), a tunnel barrier layer 1105 and a free layer structure 1106 (first magnetic and electrically conductive layers). Next in FIG. 12, a mask without undercuts 1200 is applied and patterned over CPP MTJ type sensor layers 1100 in a central region 1252 using a photolithographic tool (step 1006 of FIG. 10). Mask without undercuts 1200 is a mask with straight sidewalls from top to bottom and may consist of many alternatives depending on the specific manufacture process of a subsequently formed CPP MTJ type sensor structure. Although mask without undercuts 1200 may be a monolayer mask, it may alternatively be a multi-layered mask (e.g. bilayer or trilayer mask) as long as it is formed without undercuts. Preferably, mask without undercuts 1200 is a trilayer mask made of a layer of Duramide®, a registered trademark of Cambrex Bio Science Rockland, Inc., formed between and in contact with a top resist layer and a bottom layer of C. Duramide® is a high performance polymer which combines sufficient physical, electrical, and mechanical properties coupled with sufficient dimensional stability and chemical resistance.

A method of making mask without undercuts 1200 is now disclosed. A layer of C is deposited over CPP MTJ type read sensor layers 1100. Next, a layer of Duramide® is deposited over and in contact with the layer of C. A top resist layer is then deposited over and in contact with the layer of Duramide®. The top resist layer is then exposed and developed.

The layers of mask without undercuts 1200 are then subjected to a reactive ion etching (RIE) process to complete formation. Preferably the width of mask without undercuts 1200 increases from top to bottom contacting a top surface of free layer structure 1106 with a suitable width so as to define an appropriate trackwidth (TW) for a subsequently formed CPP MTJ type sensor structure defined in central region 1252 which is surrounded by end regions 1250 and 1254.

Figure 12:
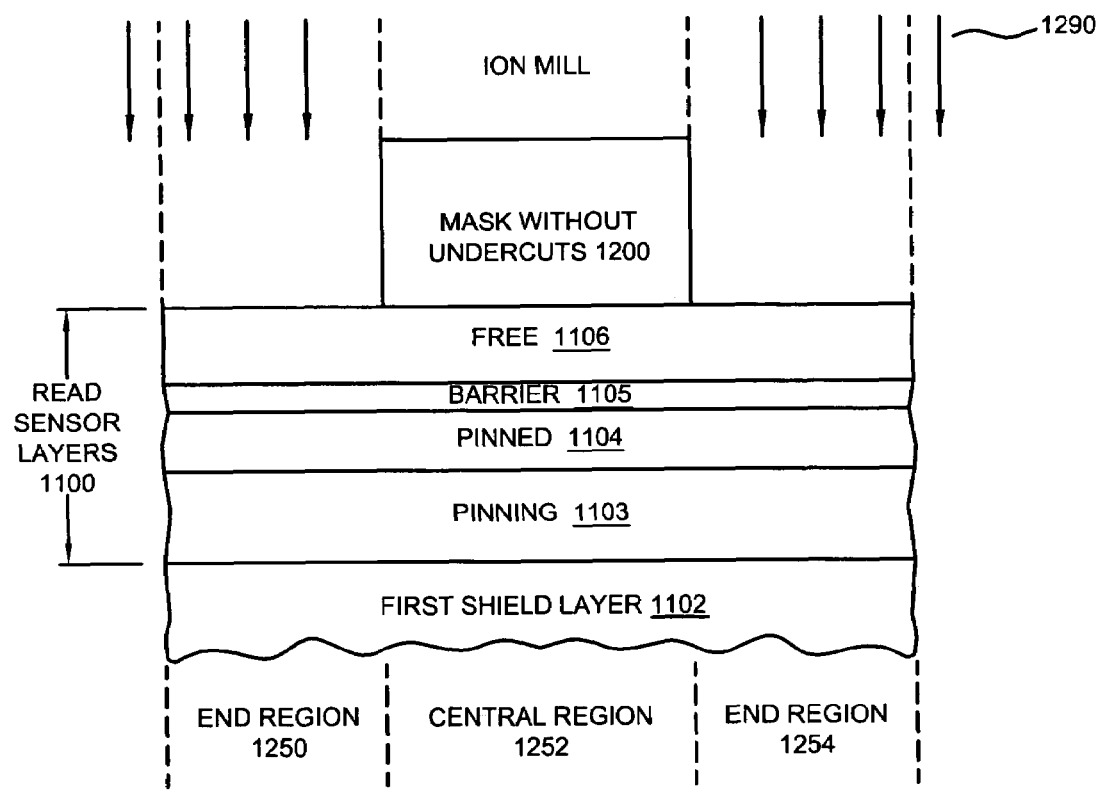
FIG. 12 is the second in a series of ABS illustrations of FIGS. 11-17 of partially fabricated CPP type sensor structures corresponding to the steps described in the flowchart of FIG. 10, which is the same as that shown in FIG. 11 except that a mask without undercuts is applied and patterned on top of the plurality of CPP type sensor layers in a central region.

With mask without undercuts 1200 in place, an ion milling process 1290 of FIG. 12 is performed to remove CPP MTJ type sensor layers 1100 in exposed end regions 1250 and 1254 (step 1008 of FIG. 10). This ion milling process is stopped at or near tunnel barrier layer 1105, to thereby result in a CPP MTJ type sensor structure 1300 of FIG. 13 (step 1010 of FIG. 10). By ion milling with mask without undercuts 1200, sharp and steep sidewalls 1320 and 1322 of CPP MTJ type sensor structure 1300 are formed which are not possible with conventional bi-layer mask structures with undercuts. Sharp and steep sidewalls 1320 and 1322 are herein defined as sidewalls substantially normal to a plane defined by CPP MTJ type sensor layers 1100 corresponding from normal to 25° from normal.

Since the ion milling is stopped at or near tunnel barrier layer 1105, a free layer structure 1106 is patterned by ion milling process 1290 but a pinned layer structure 1104 and a pinning layer structure 1103 are not. The act of stopping ion milling process 1290 refrains from removing most if not all of the second magnetic and electrically conductive layers as well as a FM layer formed beneath tunnel barrier layer 1305. As such, re-deposition of magnetic and electrically conducting material (such as metal particles or contamination) along the side edges of tunnel barrier layer 1305 does not occur. This reduces a likelihood of electrical shorting around the side edges of tunnel barrier layer 1305 between free layer structure 1306 and pinned layer structure 1304. Alternatively, note that ion milling process 1290 could continue past tunnel barrier layer 1305 and slightly into pinned layer structure 1304.

Figure 13:
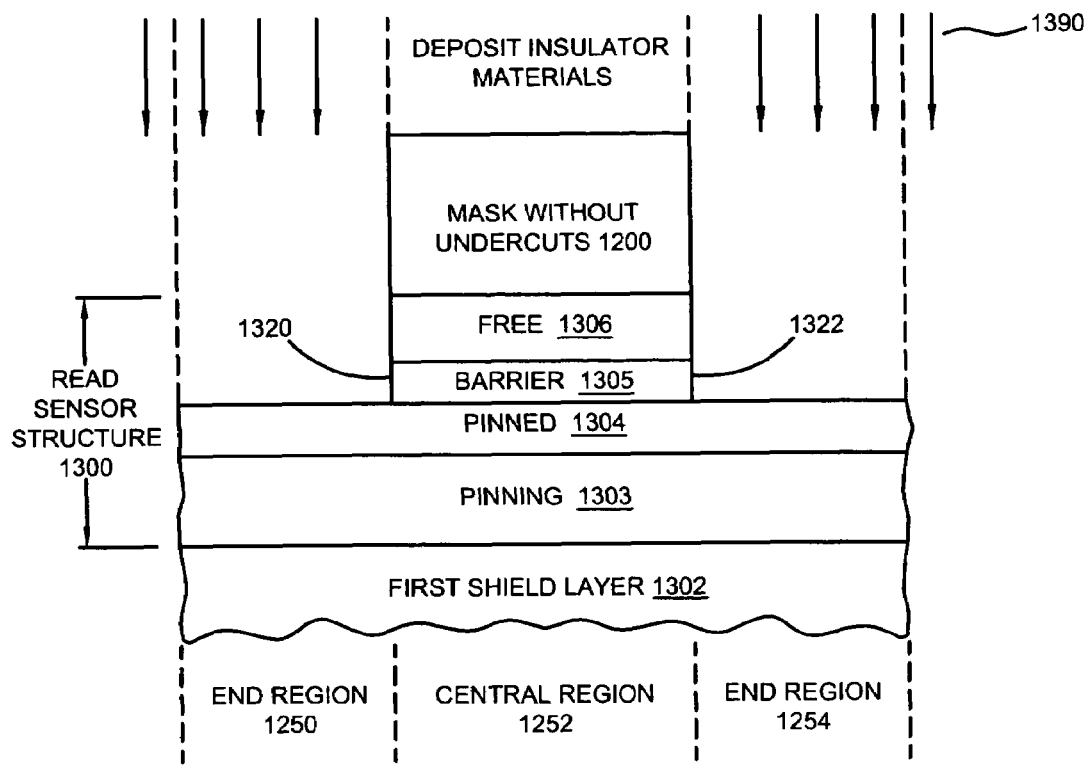
FIG. 13 is the third in a series of ABS illustrations of FIGS. 11-17 of partially fabricated CPP type sensor structures corresponding to the steps described in the flowchart of FIG. 10, which is the same as that shown in FIG. 12 except where CPP type sensor layer materials are removed in the end regions to at or near a spacer layer from a previous ion milling process.
Figure 14:
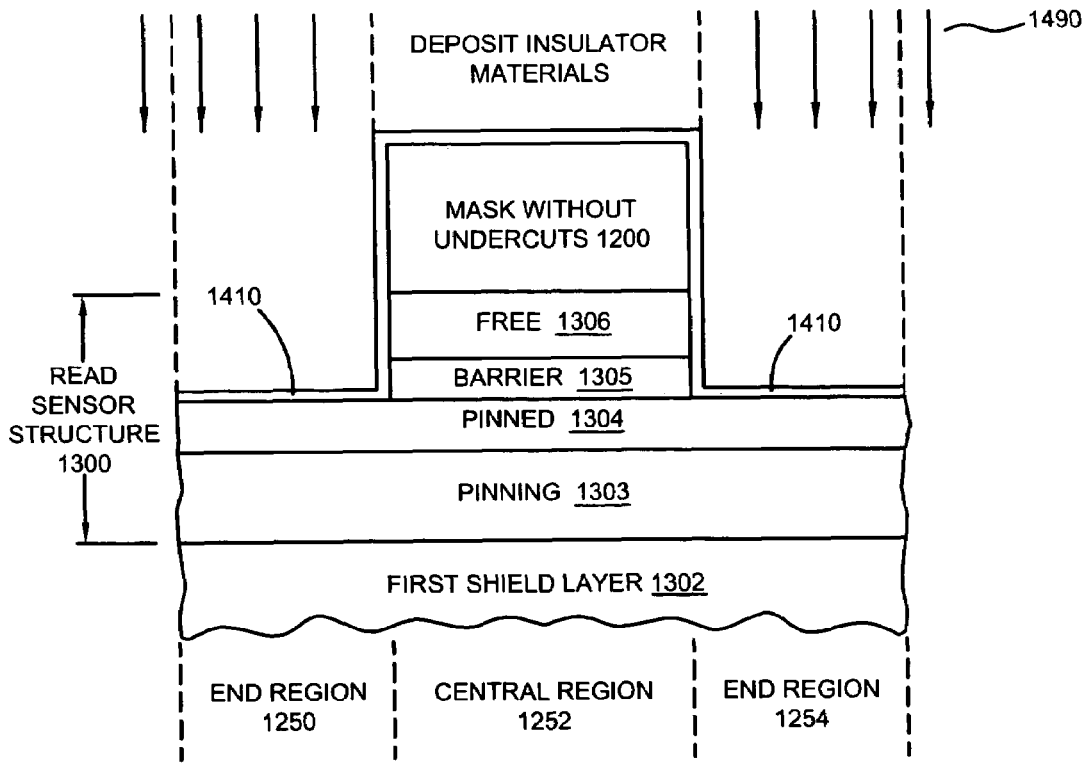
FIG. 14 is the fourth in a series of ABS illustrations of FIGS. 11-17 of partially fabricated CPP type sensor structures corresponding to the steps described in the flowchart of FIG. 10, which is the same as that shown in FIG. 14 except that insulator materials are deposited in the end regions where the CPP type sensor layer materials were removed.

In FIG. 13, a deposition process 1390 is then performed to deposit insulator materials over the structure (step 1012 of FIG. 10). The result is shown in FIG. 14. Note that insulator materials 1410 are formed in end regions 1250 and 1254 along sharp and steep sidewalls 1320 and 1322 of CPP MTJ type sensor structure 1300, as well as all the way up and around mask without undercuts 1200. In the present embodiment, insulator materials 1410 are used for confining a perpendicular current $I_p$ through CPP MTJ type sensor structure 1300 in central region 1252. A unique combination using mask without undercuts 1200 and the act of stopping ion milling process 1290 at or near tunnel barrier layer 1105 minimizes a thickness of insulator materials 1410 to thereby increase an efficiency of subsequently formed hard bias materials on free layer structure 1306 for improved sensor performance through improved amplitude and stability.

Figure 15:
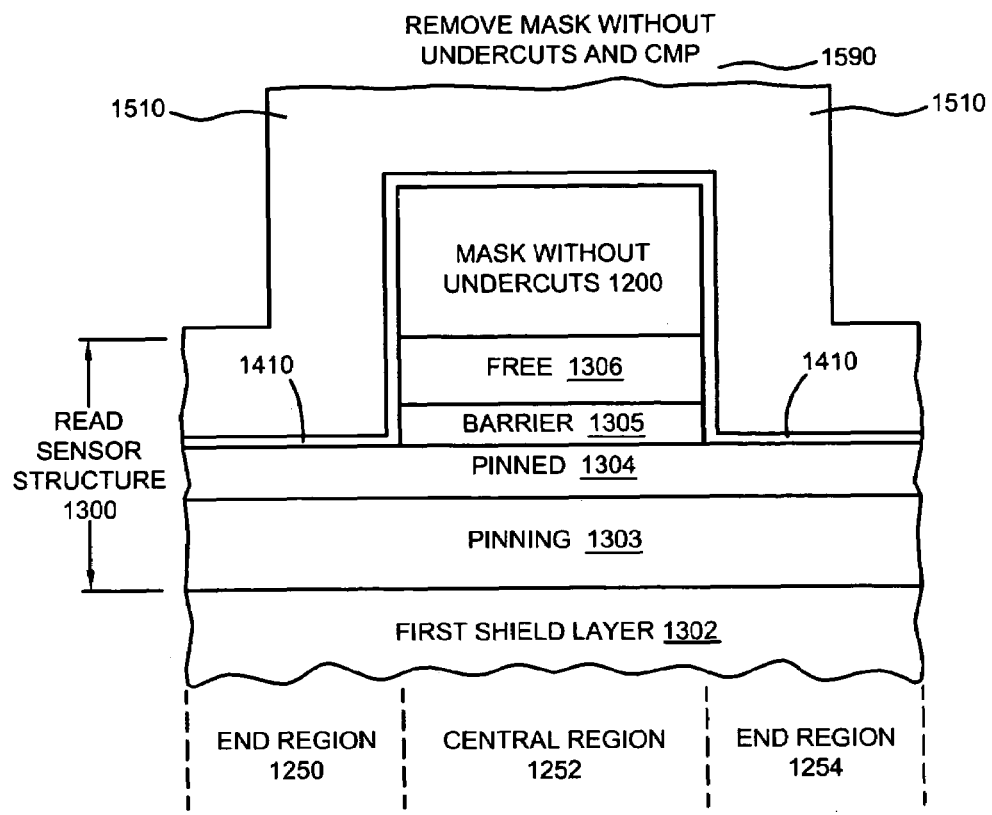
FIG. 15 is the fifth in a series of ABS illustrations of FIGS. 11-17 of partially fabricated CPP type sensor structures corresponding to the steps described in the flowchart of FIG. 10, which is the same as that shown in FIG. 13 except hard bias materials are deposited in the end regions over the insulator materials.

In FIG. 14, a deposition process 1490 is then performed to deposit magnetic hard bias materials 1510 over insulator materials 1410 (step 1014 of FIG. 10). The result is shown in FIG. 15. Magnetic hard bias materials 1510 may be deposited via ion beam sputtering deposition. In the present embodiment, magnetic hard bias materials 1510 are used to help stabilize free layer structure 1306. Alternatively, magnetic materials may be deposited over insulator materials 1410. Note that metallic seed materials may be deposited subsequent to the deposition of insulator materials 1410 and prior to the deposition of magnetic hard bias materials 1510 in order to set a texture for magnetic hard bias materials 1510.

Figure 16:
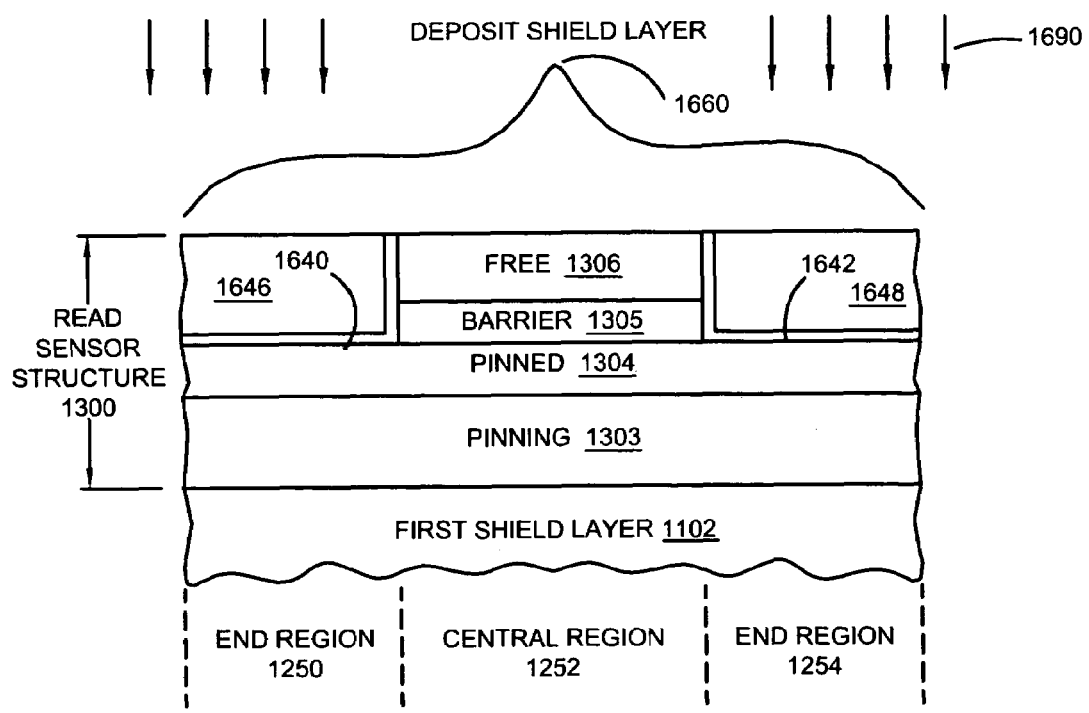
FIG. 16 is the sixth in a series of ABS illustrations of FIGS. 11-17 of partially fabricated CPP type sensor structures corresponding to the steps described in the flowchart of FIG. 10, which is the same as that shown in FIG. 15 except the mask without undercuts is removed and a chemical mechanical polishing step is performed to produce a planarized top surface.
Figure 17:
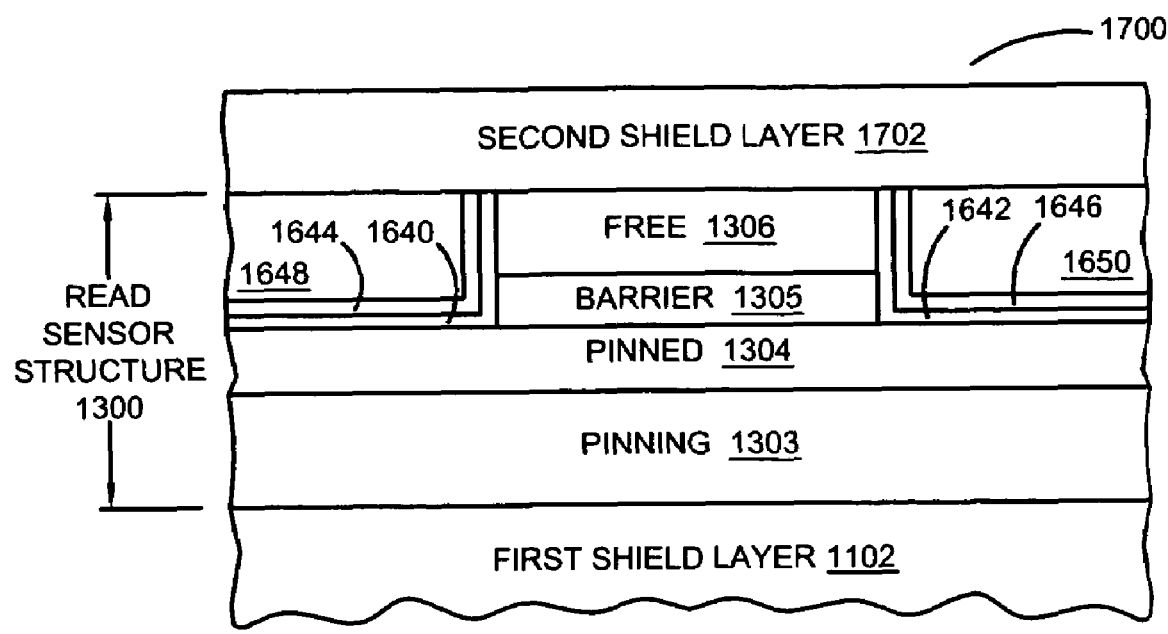
FIG. 17 is the seventh in a series of ABS illustrations of FIGS. 11-17 of partially fabricated CPP type sensor structures, which is the same as that shown in FIG. 16 except a second shield layer is deposited over the planarized top surface.

In FIG. 15, a chemical-mechanical polishing (CMP) assisted lift-off process 1590 is used to remove mask without undercuts 1200 as well as to form a planarized top surface (step 1016 of FIG. 10). The resulting planarized top surface 1660 without the mask is shown in FIG. 16. Due to the removal of materials in central region 1252 from the CMP assisted lift-off process, the insulator materials become separated insulator layers 1640 and 1642 in side regions 1250 and 1254, respectively, and the magnetic hard bias materials become separated magnetic hard bias layers 1646 and 1648, respectively. Finally, a deposition process 1690 is performed to deposit a second shield layer 1702 over planarized surface 1660 as shown in FIG. 17. Note that second shield layer 1702 is formed in contact (mechanically and electrically) with planarized surface 1660 and the top of CPP MTJ type sensor structure 1300. In the present embodiment, second shield layer 1702 also serves as a second electrically conducting lead for CPP MTJ type sensor 1700. Deposition process 1690 completes all manufacturing steps associated with the present invention, resulting in a CPP MTJ type sensor 1700 shown in FIG. 17.

Exemplary thicknesses and materials of the layers for the preferred embodiment of the present application CPP MTJ type sensor 1700 are now discussed. First shield layer 1102 and second shield layer 1702 may comprise any suitable electrically conducting material known in the art, such as NiFe or CoFe. Pinning layer structure 1303 may comprise any suitable AFM material known in the art, such as PtMn or IrMn, and have a thickness range of 50-200 Å. Pinned layer structure may comprise any suitable magnetic and electrically conducting material known in the art, such as CoFe, and have a thickness range of 10-60 Å. Tunnel barrier layer 1305 may comprise any suitable non-magnetic insulator material known in the art, such as $Al_2O_3$, and have a thickness range of 5-50 Å. Free layer structure 1306 may comprise any suitable magnetic and electrically conducting material known in the art, such as CoFe or NiFe, and have a thickness range of 15-100 Å. Insulator layers 1640 and 1642 may comprise any suitable dialectric material known in the art, such as $Al_2O_3$, and have a thickness range of 10-200 Å. Magnetic hard bias layers 1646 and 1648 may comprise any suitable hard magnetic material known in the art such as CoPtCr or other Co-based alloy, and have a thickness range of 25-300 Å. As discussed previously, alternatively deposited metallic seed materials may comprise any suitable metallic material, such as Cr, and have a thickness range of 10-200 Å.

Exemplary variations in structure, materials and thicknesses of various components of CPP MTJ type sensor 1700 will now be discussed. Referring back to FIG. 11, the plurality of CPP MTJ type sensor layers 1100 includes, from bottom to top, a pinning structure 1103, a pinned structure 1104, a tunnel barrier layer 1105 and a free layer structure 1106. A seed layer structure (not shown in FIG. 11) may be formed over first shield layer 1102 and underneath pinning layer structure 1103 for promoting an improved texture of the layers deposited thereon. The seed layer structure may include any suitable material known in the art, such as NiFeCr or Ta, and have a thickness range of 10-40 Å. Furthermore, the seed layer structure may alternatively be a multi-layer seed layer structure. Pinning layer structure 1103 may be a single layer of material or alternatively a multi-layer pinning layer structure. Pinned layer structure may be a single layer of material or a multi-layer pinned layer structure, which may further include an AP pinned layer structure. An AP pinned layer structure includes an antiparallel coupling (APC) layer is located between a first and a second ferromagnetic AP pinned layer (AP1) and (AP2). The first AP pinned layer is exchange-coupled to pinning layer structure 1103 which pins a magnetic moment of the first AP pinned layer perpendicular to the ABS in a direction out of or into CPP MTJ type sensor layers 1100. The first and second AP pinned layers of the AP pinned layer structure may be made of any suitable material known in the art, such as CoFe, and have a thickness range of 10-50 Å, respectively. The APC layer of the AP pinned layer structure may be made of any suitable insulating material known in the art, such as Ru, and have a thickness range of 3-15 Å. Alternatively, an AP self-pinned structure may be employed in contrast to the previously described AP pinned layer structure and pinned layer structure 1104. Note that no pinning layer structure would be necessary for pinning the AP self-pinned structure for this alternative. A self-pinned CPP MTJ type sensor relies on magnetostriction of the AP self-pinned structure as well as ABS stress for a self-pinning effect. Note that pinning layer structure 1103, which is typically as thick as 150 Å, would not be necessary for pinning purposes. Free layer structure 1106 may be a single layer of material or alternatively a multi-layer free layer structure. Free layer structure 1106 may even be an AP free layer structure, which includes an APC layer located between a first and a second AP coupled free layer (APF1) and (APF2). Note also that a cap layer may be formed beneath the second shield layer (not shown in FIG. 11) and above free layer structure 1106. The cap layer may be made of any suitable electrically conducting material known in the art, such as Rh, and have a thickness range of 20-100 Å. Another variation to CPP MTJ type sensor layers 1100 may involve an in-stack biasing structure formed underneath the second shield layer (not shown in FIG. 11) and incorporated in free layer structure 1106. The in-stack biasing structure may include, among other variations, an AFM pinning layer structure, a FM pinned layer structure, and a nonmagnetic spacer layer. The in-stack biasing structure would be for stabilizing free layer structure 1106 and provided in lieu of the hard bias materials in the end regions.

Final Comments. Methods for use in forming current-perpendicular-to-the-planes (CPP) type sensors, including CPP giant magnetoresistance (GMR) type and CPP magnetic tunnel junction (MTJ) type sensors are disclosed. In one particular example, a plurality of CPP type sensor layers are formed over a wafer and a mask without undercuts is formed over the plurality of CPP type sensor layers in a central region. With the mask without undercuts in place, an ion milling process is started to remove CPP type sensor layer materials left exposed by the mask without undercuts in end regions which surround the central region. The ion milling process is stopped at or near a spacer layer of the CPP type sensor layers. Insulator materials are then deposited in the end regions where the CPP type sensor layer materials were removed, followed by hard bias materials over the insulator materials. The mask without undercuts is then removed through use of a chemical-mechanical polishing (CMP) assisted lift-off process, which also planarizes the top surface. Typical sensor techniques of the art are then performed to complete manufacture of the CPP type sensor. Using the mask without undercuts enables the removal of a freelayer of the plurality of CPP type sensor layers down to the spacer layer or beyond to form the CPP type sensor with sharp and steep sidewalls which is not possible with conventional mask structures. The act of stopping the ion milling process at or near the spacer layer reduces a likelihood of electrical shorting around side edges of the spacer layer. This unique combination thereby results in improved CPP type sensor performance through improved amplitude and stability.

It is to be understood that the above is merely a description of preferred embodiments of the invention and that various changes, alterations, and variations may be made without departing from the true spirit and scope of the invention as set for in the appended claims. Few if any of the terms or phrases in the specification and claims have been given any special meaning different from their plain language meaning, and therefore the specification is not to be used to define terms in an unduly narrow sense.

What is claimed is:

1. A method of making a current-perpendicular-to-the-planes (CPP) type sensor, comprising:
   depositing a plurality of sensor layers over a wafer;
   forming, over the sensor layers, a mask without undercuts in a central region;
   with the mask without undercuts in place:
      starting an ion milling process to remove sensor layer materials, including nonmagnetic spacer layer materials, left exposed by the mask without undercuts in end regions which surround the central region;
      stopping the ion milling process at or near the removal of the nonmagnetic spacer layer materials in the end regions, for forming a read sensor structure having a free layer with sidewalls that are in alignment with sidewalls of a nonmagnetic spacer layer; and
      after the ion milling process, depositing insulator materials in the end regions and over the aligned sidewalls of the free layer and the nonmagnetic spacer layer.

2. The method of claim 1, wherein the CPP type sensor comprises a CPP giant magnetoresistive (GMR) type.

3. The method of claim 1, wherein the CPP type sensor comprises a CPP magnetic tunnel junction (MTJ) type and the nonmagnetic spacer layer comprises a tunnel barrier layer.

4. The method of claim 1, wherein the spacer layer comprises an electrically conductive material.

5. The method of claim 1, wherein the spacer layer comprises an electrically nonconductive material.

6. The method of claim 1, wherein the act of stopping the ion milling process comprises the further act of refraining from removing most if not all of an electrically conductive layer formed beneath the spacer layer.

7. The method of claim 1, wherein the act of stopping the ion milling process comprises the further act of refraining from removing most if not all of a ferromagnetic (FM) pinned layer formed beneath the spacer layer.

8. The method of claim 1, further comprising:
   performing a planarization process for removing the mask without undercuts.

9. The method of claim 1, further comprising:
   with the mask without undercuts in place:
      depositing hard bias materials over the insulator materials.

10. The method of claim 1, further comprising:
    with the mask without undercuts in place:
       depositing magnetic materials over the insulator materials.

11. The method of claim 1, wherein the act of depositing the plurality of sensor layers comprises the further act of depositing an in-stack biasing layer with the sensor layers.

12. The method of claim 1, further comprising:
removing the mask without undercuts; and
forming an electrically conductive lead layer over the read sensor structure.

13. The method of claim 1, further comprising:
removing the mask without undercuts through use of a chemical-mechanical polishing (CMP) assisted lift-off process; and
forming an electrically conductive lead layer over the read sensor structure.

14. The method of claim 1, wherein the act of stopping the ion milling process reduces a likelihood of electrical shorting around the sidewalls of the nonmagnetic spacer layer.

15. The method of claim 1, wherein the use of the mask without undercuts results in sidewalls of the read sensor structure being substantially normal to a plane defined by the sensor layers.

16. The method of claim 1, wherein the use of the mask without undercuts and the act of stopping the ion milling process at or near the removal of the nonmagnetic spacer layer materials minimizes a thickness of the subsequently deposited insulator materials, thereby increasing an efficiency of subsequently deposited hard bias materials on the free layer for improved sensor performance through improved amplitude and stability.

17. A method of making a current-perpendicular-to-the-planes (CPP) type sensor, the method comprising the acts of:
depositing a plurality of sensor layers over a first electrically conductive lead layer of the sensor;
forming, over the sensor layers, a mask without undercuts in a central region;
with the mask without undercuts in place:
starting an ion milling process to remove sensor layer materials, including spacer layer materials, left exposed by the mask without undercuts in end regions which surround the central region;
stopping the ion milling process at or near the removal of the spacer layer materials in the end regions, to thereby refrain from removing most if not all of an electrically conductive layer formed beneath the spacer layer, for forming a read sensor structure having a free layer with sidewalls that are in alignment with sidewalls of a spacer layer;
depositing insulator materials in the end regions and over the aligned sidewalls of the free layer and the spacer layer;
removing the mask without undercuts through use of a planarization process; and
forming a second electrically conductive lead layer of the sensor over the read sensor structure.

18. The method of claim 17, wherein the CPP type sensor comprises a CPP giant magnetoresistive (GMR) type.

19. The method of claim 17, wherein the CPP type sensor comprises a CPP magnetic tunnel junction (MTJ) type and the spacer layer comprises a tunnel barrier layer.

20. The method of claim 17, wherein the spacer layer comprises an electrically conductive material.

21. The method of claim 17, wherein the spacer layer comprises an electrically nonconductive material.

22. The method of claim 17, wherein the electrically conductive layer comprises a magnetic material.

23. The method of claim 17, wherein the electrical conductive layer comprises a ferromagnetic (FM) pinned layer of the sensor.

24. The method of claim 17, further comprising:
prior to forming the second electrically conductive lead layer, depositing hard bias materials over the insulator materials in the end regions.

25. The method of claim 17, wherein the planarization process utilizes a chemical-mechanical polishing (CMP) process.

26. The method of claim 17, wherein the act of depositing the plurality of sensor layers comprises the further act of depositing an in-stack biasing layer with the sensor layers.

27. The method of claim 17, wherein the use of the mask without undercuts results in sidewalls of the read sensor structure being substantially normal to a plane defined by the sensor layers.

28. The method of claim 17, wherein the act of stopping the ion milling process reduces a likelihood of electrical shorting around the sidewalls of the spacer layer.

29. The method of claim 17, wherein the combination of the mask without undercuts and the act of stopping the ion milling process at or near the removal of the spacer layer materials minimizes a thickness of the subsequently deposited insulator materials to thereby increase an efficiency of subsequently deposited hard bias materials on the free layer for improved sensor performance through improved amplitude and stability.

* * * * *